United States Patent [19]

Matsumoto et al.

[11] Patent Number: 5,161,432
[45] Date of Patent: Nov. 10, 1992

[54] ENGINE BRAKE CONTROL SYSTEM FOR AUTOMATIC POWER TRANSMISSION WITH VARIABLE RESPONSE CHARACTERISTICS IN SHIFTING OPERATIONAL MODE INTO ENGINE BRAKING RANGE

[75] Inventors: Shigetsugu Matsumoto; Naonori Iizuka, both of Shizuoka, Japan

[73] Assignee: Jatco Corporation, Japan

[21] Appl. No.: 670,334

[22] Filed: Mar. 15, 1991

Related U.S. Application Data

[63] Continuation-in-part of Ser. No. 480,717, Feb. 15, 1990, Pat. No. 5,069,085.

[51] Int. Cl.⁵ .................. F16H 59/44; F16H 59/24
[52] U.S. Cl. ........................... 74/866; 74/861; 364/424.1
[58] Field of Search ............ 192/4 A; 364/424.1; 74/866, 861

[56] References Cited

U.S. PATENT DOCUMENTS

| | | | |
|---|---|---|---|
| 4,319,501 | 3/1982 | Sugimoto | 74/866 |
| 4,563,917 | 1/1986 | Higashi et al. | 74/866 |
| 4,680,992 | 7/1987 | Hayasaki et al. | 74/869 |
| 4,696,380 | 9/1987 | Kita | 192/4 A |
| 4,736,813 | 4/1988 | Hayama et al. | 74/866 X |
| 4,742,732 | 5/1988 | Hiramatsu | 74/866 |
| 4,771,657 | 9/1988 | Iwatsuki | 74/866 |
| 4,787,258 | 11/1988 | Yamamoto et al. | 74/866 |
| 4,829,435 | 5/1989 | Isono | 192/4 A |
| 4,889,015 | 12/1989 | Kondo | 364/424.1 X |
| 4,891,759 | 1/1990 | Kato | 74/866 X |
| 4,933,850 | 6/1990 | Wheeler | 74/866 X |
| 5,016,495 | 5/1991 | Takizawa | 192/4 A X |
| 5,022,286 | 6/1991 | Takizawa | 74/866 |
| 5,054,336 | 10/1991 | Takizawa | 192/4 A X |
| 5,069,085 | 12/1991 | Iizuka | 74/866 |

Primary Examiner—Richard Lorence
Assistant Examiner—Khoi Q. Ta
Attorney, Agent, or Firm—Ronald P. Kananen

[57] ABSTRACT

An engine brake control system generally engages an overrun clutch in overall throttle valve open angle range at operational ranges for effecting engine brake. The control system is responsive to variation of selected operational range from a high transmission speed ratio range for automatic speed ratio selection to the engine braking range for establishing engagement of the overrun clutch with a predetermined lag time. The predetermined lag time is adjusted depending upon the vehicle driving condition.

8 Claims, 10 Drawing Sheets

FIG. 2

| | | C18 | C20 | C22 | C24 | B28 | B26 | OWC 30 | OWC 29 | GEAR RATIO | $\alpha_1 = 0.440$ $\alpha_2 = 0.493$ |
|---|---|---|---|---|---|---|---|---|---|---|---|
| D RANGE | 1ST. SPEED | | | ◯ | | | | ◯ | ◯ | $\dfrac{1+\alpha_2}{\alpha_2}$ | 3.027 |
| | 2ND. SPEED | | ◯ | ◯ | | ◯ | | ◯ | | $\dfrac{\alpha_1+\alpha_2+\alpha_1\alpha_2}{\alpha_2(1+\alpha_1)}$ | 1.619 |
| | 3RD. SPEED | | ◯ | ◯ | ◯ | | | ◯ | | 1 | 1.000 |
| | 4TH. SPEED | | | (◯) | ◯ | ◯ | | | | $\dfrac{1}{1+\alpha_1}$ | 0.694 |
| ENGINE BRAKING STATE | 1ST. SPEED | | | (◯) | | | | (◯) | (◯) | | |
| | 2ND. SPEED | | | (◯) | ◯ | | ◯ | (◯) | | | |
| | 3RD. SPEED | | ◯ | (◯) | ◯ | | | (◯) | | | |
| | 4TH. SPEED | | ◯ | | | ◯ | | | | | |
| REVERSE | | ◯ | | | | | ◯ | | | $-\dfrac{1}{\alpha_1}$ | -2.272 |

( ) IRRELEVANT FOR POWER

FIG.10
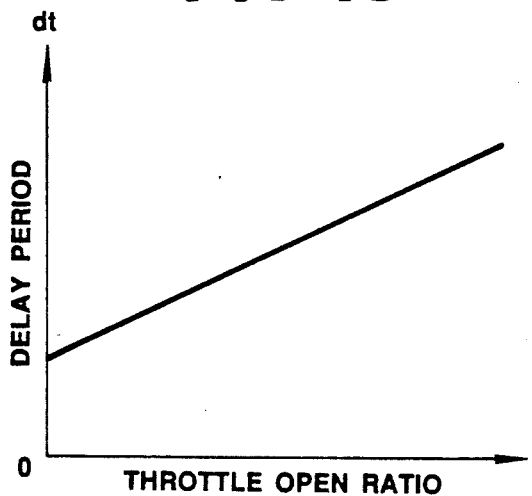
FIG.11
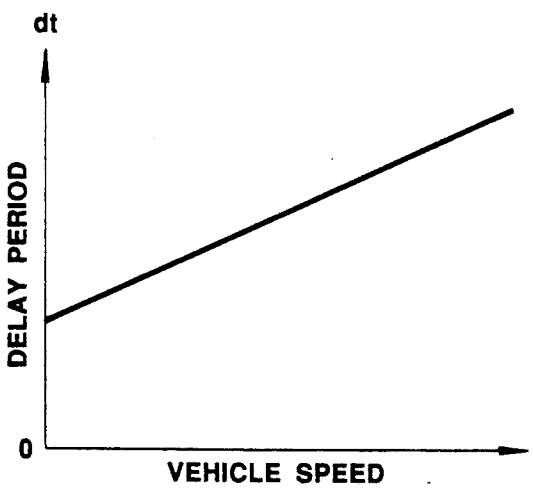
FIG.12
| ITEM<br>RANGE | SPEED RATIO | OD SWITCH | THROTTLE OPEN RATIO |
|---|---|---|---|
| D RANGE | $D_1, D_2, D_3, D_4$ | OFF ONLY | 1/16 OR LESS |
| 2 RANGE | $2_1, 2_2$ | BOTH OF ON AND OFF | ALL RANGE |
| 1 RANGE | $1_1, 1_2$ | | |

ENGINE BRAKE CONTROL SYSTEM FOR AUTOMATIC POWER TRANSMISSION WITH VARIABLE RESPONSE CHARACTERISTICS IN SHIFTING OPERATIONAL MODE INTO ENGINE BRAKING RANGE

CROSS-REFERENCE TO THE RELATED APPLICATION

This application is a continuation-in-part Application of the co-pending U.S. patent application Ser. No. 480,717, filed on Feb. 15, 1990, now U.S. Pat. No. 5,069,085 issued Dec. 3, 1991 which has been assigned to the common owner of the present invention and now pending.

BACKGROUND OF THE INVENTION

1. Field of the Invention

The present invention relates generally to a control system for an automotive automatic power transmission. More specifically, the invention relates to an automatic power transmission control system applicable for an automatic power transmission having a power transmission system which includes an one-way clutch for reducing shock upon effecting engine braking. Further specifically, the invention relates to an automatic power transmission control system for controlling timing of delivery of negative torque for an automotive engine for deceleration.

2. Description of the Background Art

It is common among modern automatic power transmissions to provide a one-way clutch for permitting engine driving torque to be delivered to the final drive and blocking negative driving torque from the final drive to the engine. Therefore, in order to make the negative torque effective for decelerating the engine, an overrun clutch is provided in a parallel relationship with the one-way clutch so that the negative driving torque is input to the engine therethrough. In order to operate the automatic power transmission, it therefore becomes necessary to appropriately control a timing to make the overrun clutch active for optimization of the engine braking effect without causing substantial shock which otherwise causes substantial degradation of vehicular driving feeling.

One of the conventionally known engine brake control systems for automatic power transmissions has been illustrated in "NISSAN SERVICE MANUAL" Vol. No. 578, issued by Nissan Motor Co., Ltd. on June, 1987, pages C-36 to C-38. In this prior system, an active range of an overrun clutch, in which the overrun clutch is engaged, is set at a throttle valve open degree of 1/16 or smaller at a transmission operational range of $D_1$ (first speed at D-range), $D_2$ (second speed at D-range) and $D_3$ (third speed at D-range) ranges and while an over-drive (OD) switch is held OFF. Also, the overrun clutch active range is set at the throttle valve open degree of 1/16 or smaller at $2_1$ (first speed at 2-range) and $2_2$ (second speed at 2-range) ranges, and at an overall throttle valve open degree at $1_1$ (first speed at 1-range) and $1_2$ (second speed at 1-range) ranges.

It can be appreciated that, in the prior proposed system, the 1-range and the 2-range are used for effecting engine braking in order to decelerate the vehicular traveling speed. In these engine braking effective ranges, if the 2-range is selected, the overrun clutch is engaged only when the throttle valve open degree is maintained smaller than or equal to 1/16 relative to the throttle valve full open position. Therefore, at a partial throttle position having a throttle open degree greater than 1/16, engine braking may not be active at the 2-range to place the vehicle in a coasting condition irrespective of the driver's demand for deceleration. On the other hand, at a part throttle condition in the vicinity of 1/16 of the throttle valve open degree, the overrun clutch is engaged when the throttle valve open angle decreases across 1/16, and engine braking becomes effective at an unexpected timing to surprise the driver and thus cause degradation of the vehicular driving feeling.

It may be possible to establish an engagement of the overrun clutch in an overall throttle valve angular range in order to avoid coasting. However, in such case, the overrun clutch is engaged instantly in response to selection of 2-range down from the D-range, and the overrun clutch as engaged may cause interlocking with a speed ratio shifting clutch (i.e., a high clutch) provided in tandem with the overrun clutch, to cause substantial shock. On the other hand, it may also be possible to set a predetermined delay time between selection of the engine braking range and engagement of the overrun clutch. In such case, the lag time is irrespective of the vehicle driving condition, such as vehicle speed, throttle valve open degree and so forth, so engagement timing cannot be optimal. Namely, in a certain vehicle driving condition, such lag time may be too short to cause premature engagement at an excess speed of the vehicle to cause a substantial shift shock. Also, in certain a case, the overrun clutch is engaged after the power transmission system is placed at a neutral condition to cause an unacceptable shock.

SUMMARY OF THE INVENTION

Therefore, it is an object of the present invention to provide a control system for an automatic power transmission of an automotive vehicle, which can adapt timing of initiating engine braking mode operation depending upon a vehicle driving condition and thus minimize shifting down shock upon effecting engine braking.

In order to accomplish the aforementioned and other objects, an engine brake control system, according to the present invention, generally engages an overrun clutch in an overall throttle valve open angle range at operational ranges for effecting engine braking. The control system is responsive to a variation of a selected operational range from a high transmission speed ratio range for an automatic speed ratio selection to the engine braking range for establishing engagement of the overrun clutch with a predetermined lag time. The predetermined lag time is adjusted depending upon the vehicle driving condition.

According to one aspect of the invention, a control system for an automatic power transmission for an automotive vehicle, comprises:

a plurality of frictional elements selectively establishing a plurality of mutually distinct transmission speed ratios which include at least one high transmission speed ratio and at least one low transmission speed ratio, the frictional elements including an overrun clutch for delivery of negative driving torque from a final drive to an automotive internal combustion engine for deceleration of the latter;

a sensor means for monitoring a vehicle traveling condition for producing a second sensor signal indicative of a vehicle traveling condition;

means for manually entering a command for selection of a transmission speed ratio among a plurality of speed ratios; and a controller responsive to the transmission speed ratio selection command, for detecting a demand for engine braking, the controller discriminating a mutually distinct first mode of engine braking demand, in which the transmission speed ratio selection command is maintained at a low transmission speed ratio, and a second mode of engine braking demand, in which the transmission speed ratio selection command is varied from the command for a high transmission speed ratio to a low transmission speed ratio, the controller being responsive to the first mode of engine braking demand for commanding engagement of the overrun clutch, and being responsive to the second mode of engine braking demand for deriving a delay time based on the second sensor signal, and commanding engagement of the overrun clutch after expiration of the delay time.

According to another aspect of the invention, a control system for an automatic power transmission for an automotive vehicle, comprises:

a plurality of frictional elements selectively establishing a plurality of mutually distinct transmission speed ratios which includes at least one high transmission speed ratio and at least one low transmission speed ratio, the frictional elements including a one-way clutch for exclusively permitting delivery of engine driving torque from an automotive internal combustion engine to a final drive, and an overrun clutch provided in a parallel relationship with the one-way clutch for exclusively delivering of engine braking torque from the final drive to the automotive internal combustion engine for deceleration of the latter;

a sensor means for monitoring a vehicle traveling condition for producing a second sensor signal indicative of a vehicle traveling condition;

means for manually entering a command for selection of a transmission speed ratio among a plurality of speed ratios;

a controller responsive to the transmission speed ratio selection command, for detecting a demand for engine braking, the controller discriminating a mutually distinct first mode of engine braking demand, in which the transmission speed ratio selection command is maintained at a low transmission speed ratio, and a second mode of engine braking demand, in which the transmission speed ratio selection command is varied from the command for high transmission speed ratio to the low transmission speed ratio, the controller being responsive to the first mode of engine braking demand for commanding engagement of the overrun clutch, and being responsive to the second mode of engine braking demand for deriving a delay time based on the second sensor signal, and commanding engagement of the overrun clutch after expiration of the delay time.

The sensor means may include a vehicle speed sensor for monitoring a traveling speed to produce a vehicle speed indicative signal, and the controller derives the delay time on the basis of the vehicle speed indicative signal so that the delay time is increased according to increasing of the vehicle speed indicative signal value. The sensor means may further comprise an engine speed demand sensor for monitoring a position of an engine speed control element which is coupled with a manually operable engine speed control means for detecting a demand for an engine revolution speed and producing a first sensor signal indicative of the monitored engine speed demand, and the controller is responsive to the engine speed demand smaller than a predetermined criterion representative of substantially no demand for engine acceleration, for instantly commanding engagement of the overrun clutch. The engine speed demand sensor comprises a throttle angle sensor for monitoring a throttle valve angular position.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings:

FIG. 2 is a chart showing active components of the power transmission of FIG. 1, which are active at respective operational ranges;

FIGS. 10 and 11 are charts showing variations of a delay time after commanding engine braking and engagement of the overrun clutch;

FIG. 12 is a table showing conditions for instant engagement of the overrun clutch.

DESCRIPTION OF THE PREFERRED EMBODIMENT

Figure 1:
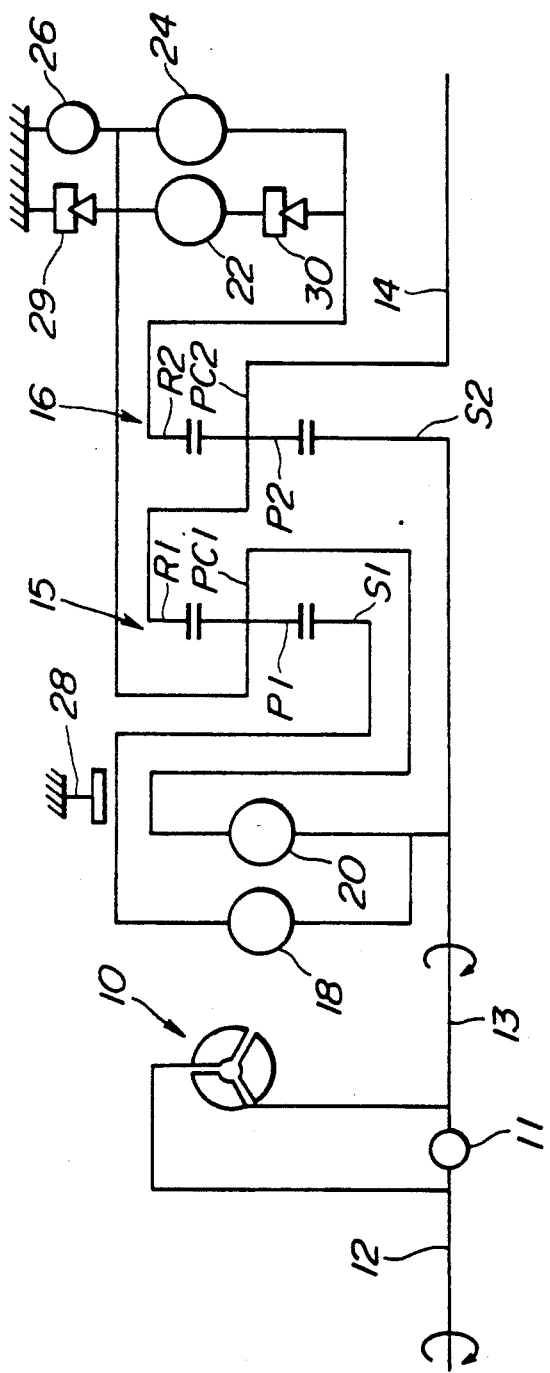
FIG. 1 is a diagrammatic illustration of an automatic power transmission to which the preferred embodiment of a shifting control system, according to the present invention, is applicable.

Referring now to the drawings, particularly to FIG. 1, there is shown an automatic power transmission having a power train of four forward speed ratios and one reverse speed ratio. The shown embodiment of the automatic power transmission is thus able to select a speed ratio among a first (Low) speed ratio, a second speed ratio, a third speed ratio and a fourth (over-drive) speed ratio in forward drive. Among these forward drive speed ratios, the first speed ratio and the second speed ratio are taken as engine braking speed ratios for effecting engine braking in order to decelerate the vehicle.

The power transmission mechanism includes an input or turbine shaft 13 connected to an output shaft 12 of an automotive internal combustion engine (not shown) which serves as a prime mover, via a torque converter 10. The power transmission mechanism also includes an output shaft 14 for finally transmitting driving torque to the drive means (final drive) of the vehicle. The torque converter 10 has a pump impeller, a turbine runner and a stator. The pump impeller is connected to the engine output shaft 12, while the turbine runner is connected to the input shaft 13. The pump impeller is also connected to an oil pump (not shown) for driving the pump impeller. Between the input shaft 13 and the output shaft 14, a first planetary gear set 15, a second planetary gear set 16, a reverse clutch (R/C) 18, a high clutch (H/C) 20, a forward clutch (F/C) 22, an overrun clutch (OR/C) 24, low-and-reverse brake (LR/B) 26, a band brake (B/B) 28, low one-way clutch (LO/C) 29 and forward one-way clutch (FO/C) 30. The torque converter incorporates a lock-up clutch 11 for selectively establishing and releasing direct coupling of the input shaft 13 with the engine output shaft 12. On the other hand, the first planetary gear set 15 includes a sun gear S1, a ring gear R1, pinions P1 and a pinion carrier PC1 supporting the pinions. The second planetary gear set 16 includes a sun gear S2, a ring gear R2, pinions P2 and a pinion carrier PC2 supporting the pinions.

The pinion carrier PC1 supporting the pinion P1 is so designed as to be connectively associated with the input shaft 13 via a high clutch (H/C) 20. The pinion carrier PC1 is also connected to the ring gear R2 of the second planetary gear set 16 via a forward clutch (F/C) 22 and a forward one-way clutch (FO/C) 30 which is coupled with the forward clutch in series, or in the alternative, via the forward clutch (F/C) 22 and a overrun clutch (OR/C) 24 which is provided in parallel to the forward one-way clutch (FO/C) 30. The pinion carrier PC1 is adapted to be anchored by a low and reverse brake (LR/B) 26 and its reverse rotation is prevented by the low one-way clutch (LO/C) 29. The sun gear S1 of the first planetary gear set 15 is so designed as to be connectively associated with the input shaft 13 via a reverse clutch (R/C) 18. The sun gear S2 of the second planetary gear set 16 is constantly connected to the input shaft 13. The ring gear R1 of the first planetary gear set 15 and the pinion carrier PC2 of the second planetary gear set 16 are constantly connected to the output shaft 14. The ring gear R1 is integrally connected with the pinion carrier PC2 of the second planetary gear set 16. The ring gear R2 is connectively associated with the pinion carrier PC1 via the overrun clutch (OR/C) 24.

In order to establish a predetermined drive relation, the forward one-way clutch (FO/C) 30 and the forward clutch (F/C) 22 are arranged between the pinion carrier PC1 and the ring gear R2 of the second planetary gear set 16. Engagement of the forward clutch (F/C) 22 causes the forward one-way clutch (FO/C) 30 to connect the ring gear R2 with the pinion carrier PC1 in the reverse rotational direction.

A low and reverse brake (LR/B) 26 can fix the pinion carrier PC1. On the other hand, a band brake (B/B) 28 can fix the sun gear S1. A low one-way clutch (LO/C) 29 permits rotation of the pinion carrier PC1 in a forward direction (the same direction as the rotating direction of the engine output shaft 12) and prevents the pinion carrier PC1 from rotating in reverse direction (a rotational direction opposite the forward direction).

The power transmission mode of the power train as set forth above is selected by a combination of the states of one or more friction elements, i.e. the reverse clutch (R/C) 18, the high clutch (H/C) 20, the forward clutch 22 (F/C), the overrun clutch (OR/C) 24, the low and reverse brake (LR/B) 26 and the band brake (B/B) 28, to establish various modes of operation of the components of S1, S2, R1, R2, PC1 and PC2 of the first and second planetary gear sets 15 and 16. With various modes of operation of the components of the first and second planetary gear sets 15 and 16, rotation speed at the output shaft 14 versus the rotation speed at the input shaft 13 is varied at various rates. Active components at respective operational modes of the transmission are illustrated by the indication '◯' in respective columns of FIG. 2. In the table of FIG. 2, $\alpha_1$ and $\alpha_2$ are the respective transmission speed ratios of the sun gears S1 and S2 versus the ring gears R1 and R2. By combinations of the gear ratios $\alpha_1$ and $\alpha_2$, the ratio of rotation of the output shaft 14 versus the rotation speed of the input shaft 13 is determined.

Figure 3:
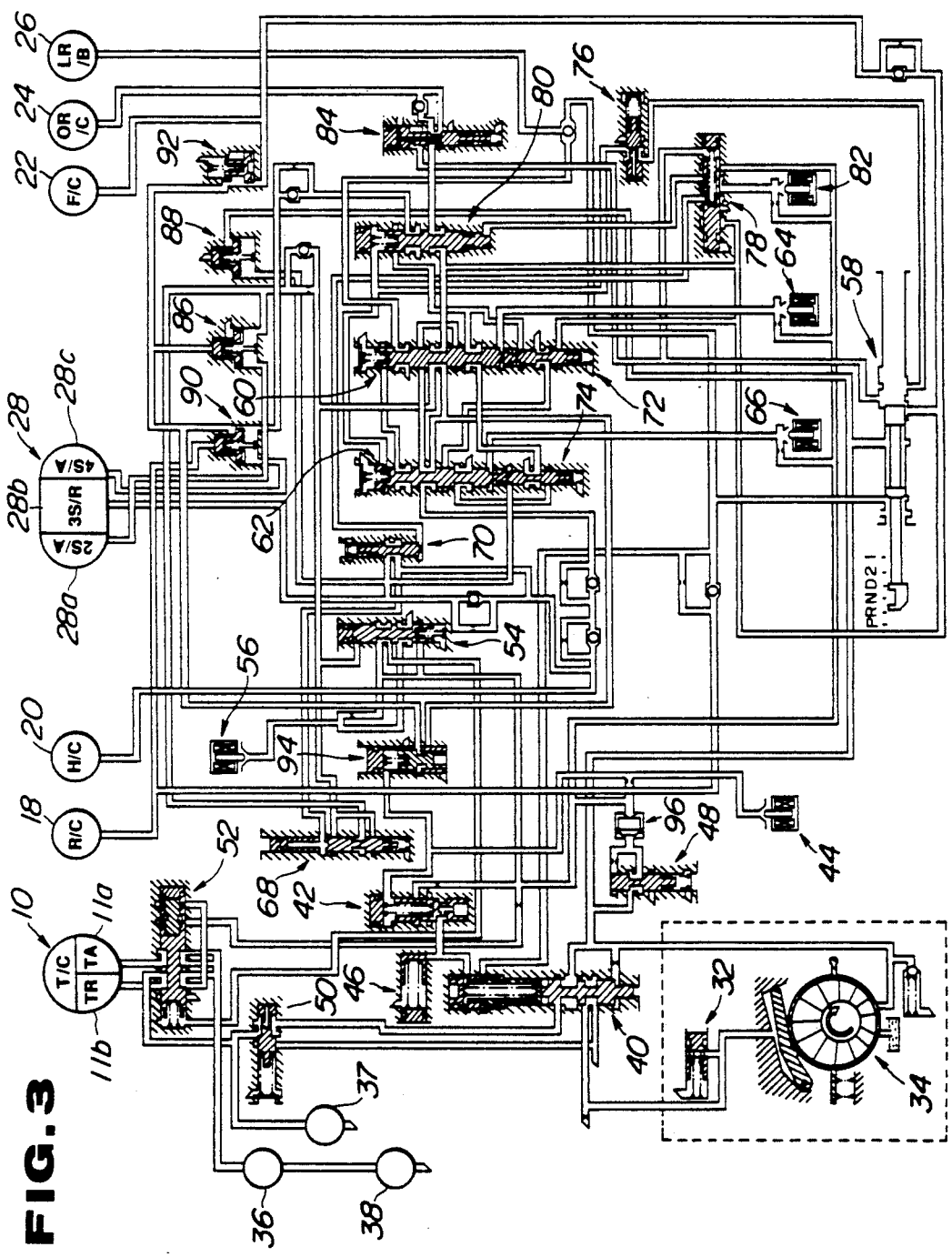
FIG. 3 is a circuit diagram of the hydraulic system of the automatic power transmission of FIG. 1.

The hydraulic system of the shown automatic transmission, as shown in FIG. 3, is provides hydraulic pressure controlling operations for respective friction elements. The hydraulic system includes a pressure regulator valve 40, a pressure modifier valve 42, a line pressure solenoid 44, a modifier pressure accumulator 46, a pilot valve 48, a torque converter release valve 50, a lock-up control valve 52, a first shuttle valve 54, a lock-up solenoid 56, a manual selector valve 58, a first shift valve 60, a second shift valve 62, a first shift solenoid 64, a second shift solenoid 66, a servo charger valve 68, a 3-2 timing valve 70, a 4-2 release valve 72, a 4-2 sequence valve 74, a first range pressure reduction valve 76, a second shuttle valve 78, an overrun clutch control valve 80, an overrun clutch solenoid 82, an overrun clutch pressure reduction valve 84, a second speed ratio servo applied pressure accumulator 86, a third speed ratio servo release pressure accumulator 88, a fourth speed ratio servo applied pressure accumulator 90, an N-D accumulator 92, an accumulator control valve 94 and a strainer 96.

The pressure regulator valve 40 adjusts a line pressure by modulating the source pressure from the oil pump depending upon driving conditions. The pressure modifier valve 42 serves to assist the pressure regulator valve 40 to adjust signal pressure (the modifier pressure for providing line adjusting pressure depending upon driving conditions). The modifier accumulator valve 46 removes pulsation from line pressure by smoothing the pressure modifier pressure supplied from the pressure modifier valve 42. The pilot valve 48 produces a pilot pressure for controlling line pressure, lock-up of the torque converter, the overrun clutch, the 3-2 timing valve and so forth. The accumulator control valve 94 controls back pressure according to driving conditions. The manual selector valve 58 is associated with a manually operable selector lever (not shown) and is shiftable according to selector lever position for selectively distributing line pressure for the corresponding friction elements set forth above. As is well known, the selector lever is shiftable between a P (parking) range, R (reverse) range, N (neutral) range, 1 (first hold) range, 2 (second hold) range, and D (automatic shifting) range. In addition, the selector lever may be associated with a manual over-drive (OD) cancel switch which selectively permits and inhibits automatic shifting to the fourth speed ratio. Among these operational ranges of the automatic power transmission, which is manually selectable through the selector lever, the 1 range and the second range are used for commanding engine braking when deceleration of the vehicle is demanded.

The first and second shift valves 60 and 62 are associated with the first shift solenoid 64 for simultaneously switching connection of three lines for controlling shifting operation between first, second, third and fourth speed ratios. The second shuttle valve 78 selectively provides pressure for the 3-2 timing control and the overrun clutch control depending upon accelerator position. Furthermore, the second shuttle valve further disables the overrun clutch for prevention of interlocking at the fourth speed ratio while a throttle valve open angle is large. The overrun clutch control valve 80 serves for switching lines in order to prevent the overrun clutch from being activated while the band brake is active at the fourth speed ratio. The 4-2 relay valve 72 stores the state of driving at the fourth speed ratio and cooperates with the 4-2 sequence valve 74 and the first and second shift valves 60 and 62 for preventing shifting from a fourth speed ratio to a third speed ratio upon 4-2 down-shifting. The 4-2 sequence valve 74 prevents the band servo pressure from being drained during 4-2 shifting operation until the high clutch operating pressure and the band servo release pressure are drained. The servo charger valve 68 is active at the third and fourth speed ratios for supplying a band servo operating pressure for the second speed ratio for enabling 4-2 and 3-2 down-shifting. The 3-2 timing valve 70 temporarily provides a neutral state for providing a delay for draining of band servo release upon 3-2 down-shifting when the vehicular speed is higher than a predetermined speed. The overrun clutch reducing valve 84 reduces operating pressure for the overrun clutch for reducing shock at initiation of engine braking. The torque converter release valve 50 prevents the torque converter pressure from becoming excessive. The lock-up control valve 52 controls a lock-up activated state and a deactivated state for providing a smooth transition. The first shuttle valve 54 switches lines for controlling lock-up control pressure at the second, third and fourth speed ratios.

In the shown construction, an apply chamber 11a and a release chamber 11b are defined in the torque converter 10 in order to control the state of the lock-up clutch 11. Namely, when the fluid pressure is supplied to the release chamber 11b, the lock-up clutch 11 is released and when the fluid pressure is supplied to the apply chamber 11a, the lock-up clutch 11 is engaged for establishing a lock-up condition. The band brake (B/B) 28 defines a second speed servo apply chamber 28a, a third speed servo release chamber 28b and a fourth speed servo apply chamber 28c. With this construction, when the second speed pressure is supplied to the second speed servo apply chamber 28a, the band brake (B/B) 28 is applied; when the third speed pressure is supplied to the third speed servo release chamber 28b, the band brake is released; and when the fourth speed pressure is supplied to the fourth speed servo apply chamber 28c, the band brake (B/B) 28 is applied.

In addition to the components set forth above, the shown embodiment of the hydraulic circuit of the automatic power transmission incorporates a variable displacement vane-type oil pump 34 associated with a feedback accumulator 32. The hydraulic circuit further comprises an oil cooler 36, a front lubricant line 37 and a rear lubricant line 38.

Further details of the hydraulic system of the shown embodiment of the automatic power transmission will be appreciated from the description given in U.S. Pat. No. 4,680,992, issued on Jul. 21, 1987, to Hayasaki et al. and from "Nissan Full-Range Electronically Controlled Automatic Transmission Service Manual", published by Nissan Motor Co., Ltd., on March, 1987. The disclosure of the above-identified publications are herein in incorporated for the sake of disclosure. Furthermore, Japanese Patent First (unexamined) Publication (Tokkai) Showa 62-62047 also discloses a hydraulic circuit similar to that illustrated in FIG. 3. The disclosure of this Japanese publication is also herein incorporated by reference for the sake of disclosure.

Figure 4:
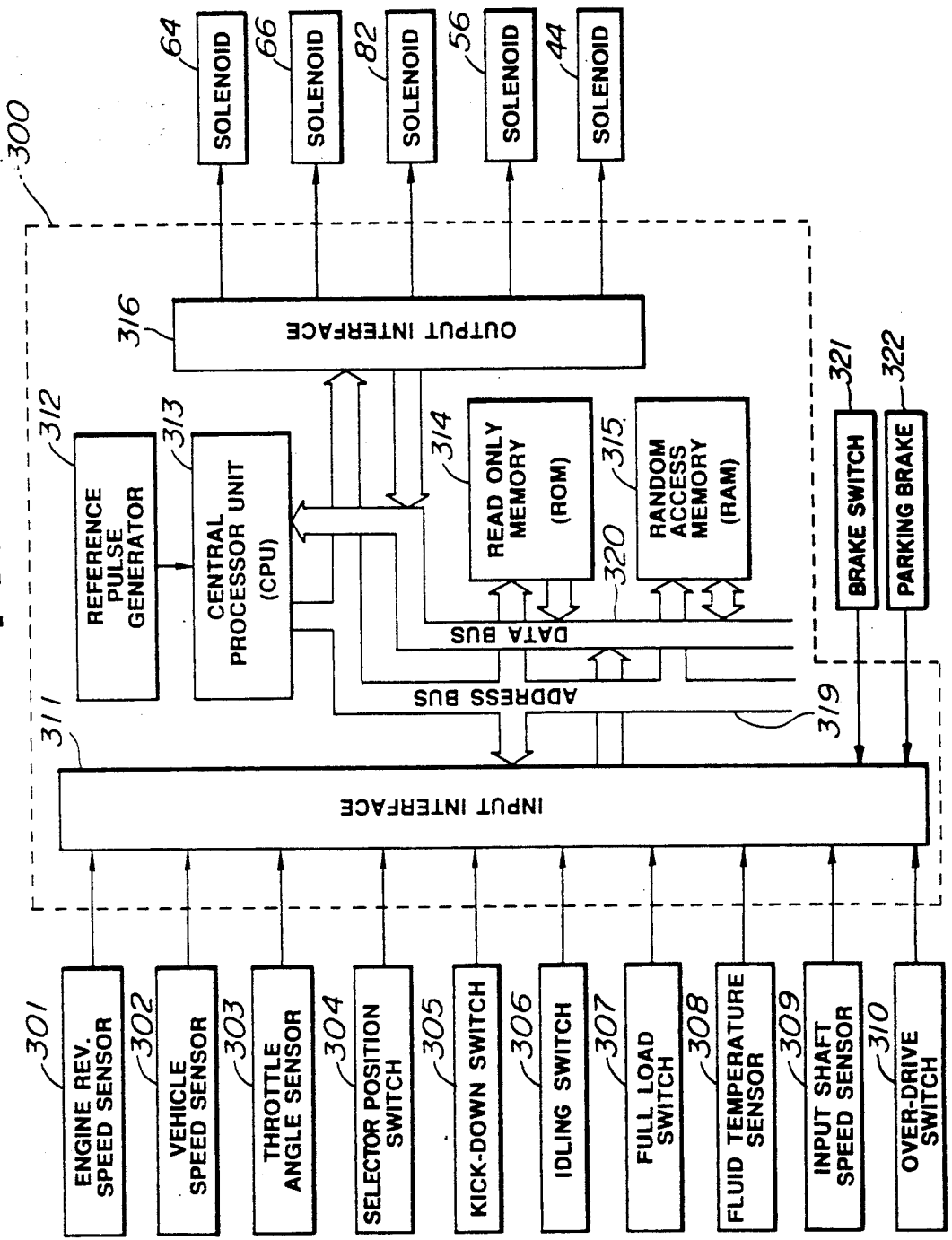
FIG. 4 is a block diagram of the preferred embodiment of a shifting control system according to the present invention.

FIG. 4 is a block diagram of a control unit 300 employed in the preferred embodiment of the transmission control system according to the present invention. The control unit 300 is composed of a microprocessor-based data processing system. The control unit 300 includes an input interface 311, a CPU 313, a ROM 314, a RAM 315 and an output interface 316. These components of the control unit 300 are connected through an address bus 319 and a data bus 320. In addition, the CPU 313 is connected to a reference pulse generator 312. In order to provide various transmission control parameters for enabling the control unit 300, an engine speed sensor 301, a vehicle speed sensor 302, a throttle angle sensor 303, a selector position switch 304, a kick-down switch 305, an idling switch 306, a full load switch 307, a fluid temperature switch 308, an input shaft speed sensor 309, an over-drive switch 310, a brake switch 321 and a parking brake switch 322, connected to the input interface 311 of the control unit 300.

The engine speed sensor 301 may comprise a crank angle sensor monitoring crankshaft angular position to produce a crank reference signal at every predetermined angular position of the crankshaft and a crank position signal at every predetermined angular displacement of the crankshaft. The engine speed sensor 301 may further comprise an engine speed counter adding the crank reference signals over a predetermined period for deriving engine revolution speed to output an engine speed indicative signal N. The vehicle speed sensor 302, which is of per se well known construction, produces a vehicle speed indicative signal V.

The throttle angle sensor 303 is associated with a throttle valve in an air induction system of an internal combustion engine. The throttle angle sensor 303 monitors the throttle valve angular position and produces a throttle valve angular signal TVO. The selector position switch 304 is associated with a selector lever of the transmission to detect the selector lever position and produce a selector position indicative signal SEL representative of a selected position. The kick-down switch 305 is associated with an accelerator pedal to detect depression magnitude of the accelerator pedal greater than a predetermined magnitude to produce a kick-down command indicative signal.

The idle switch 306 is designed for detecting a fully closed position of the throttle valve to produce an engine idling condition indicative signal. The full load switch 307 is provided for detecting a fully open position of the throttle valve to produce an full load condition indicative signal. The fluid temperature sensor 308 monitors the temperature of lubricant in the transmission to produce a fluid temperature indicative signal. The input shaft speed sensor 309 monitors the rotation speed of the transmission input shaft 13 to produce an input shaft speed indicative signal. The over-drive switch 310 is associated with the selector lever for manual selection of the fourth speed ratio (over-drive) enabling or inhibiting state and produces an over-drive enable indicative signal when enabled. The brake switch 321 is associated with a vehicular brake pedal for detecting application of the brake for producing a braking state indicative signal. Similarly, the parking brake switch 322 detects the status of the parking brake to produce a parking brake applied state indicative signal.

The sensors, detectors and switches set forth above provide information necessary for performing transmission shifting control. A practical process for transmission shifting control have been disclosed in the aforementioned "Nissan Full-Range Electronically Controlled Automatic Transmission RE4R01A Service Manual", previously incorporated by reference.

The control unit 300 is so programmed to process various shifting control parameter signals provided from the sensors, detector switches and so forth for selecting the appropriate transmission speed ratio. Among various shifting control operations, the control unit 300 performs control for adjusting down-shift timing in response to a manually entered command for down-shifting, particularly for obtaining an engine braking effect for decelerating the vehicle. As will be appreciated, the down shift command is normally entered by operating a manually operable selector to a lower speed ratio range. In general, the timing of down-shifting of the transmission speed ratio is determined in terms of vehicle speed and the throttle valve angular position in relation to down-shifting criterion. Therefore, down-shifting criterion are set respective of transmission speed ratio ranges so that a down-shifting operation according to a command for shifting the transmission speed ratio to a lower speed ratio is carried out when the vehicle speed drops across the down-shifting criterion. As can be appreciated, the down-shifting command can be generated not only in response to manual shifting of the selector lever to the lower speed range but also in response to a vehicle driving condition satisfying a predetermined engine brake active condition in the at D range of the selector position.

In order to establish an engine braking mode of operation of the automatic power transmission, the overrun clutch 24 is to be engaged for transmitting a negative driving torque to the automotive engine for decelerating the engine speed and thereby decelerating the vehicular driving speed. Therefore, in the shown embodiment, the overrun clutch 24 is engaged in response to manually entered engine braking command or automatically generated engine braking command for engine braking effect. As set out in the introduction of the disclosure, timing of engagement of the overrun clutch 24 is variable depending upon the current speed ratio and the commanded speed ratio to be shifted down. For instance, in the shown embodiment, the overrun clutch 24 is constantly engaged in over all of the throttle valve open angle range while the transmission operational range is the engine braking range, i.e. a 1 range or a 2 range. On the other hand, at the down-shifting from a higher speed ratio, i.e. a third transmission speed ratio or a fourth transmission speed ratio at a D range, engagement of the overrun clutch 24 is established after a given delay time. In order to successfully avoid engine braking shock which can otherwise be caused by interlocking of the high clutch and the overrun clutch arranged in a series relationship to each other upon engagement of the overrun clutch, the given delay time in the shown embodiment is variable depending upon the throttle valve open ratio and/or the vehicle speed.

A control operation for controlling down-shifting transmission and effecting of engine braking to be taken place by the shown embodiment of the shift control system will be discussed herebelow with reference to the flowcharts showing routines to be executed by the CPU 313 of the control unit 300.

According to the present invention, first and second down-shifting criteria are set for determining the down-shift timing of the transmission speed ratio, which first down-shifting criterion is set at a vehicle speed higher than that of the second down-shifting criterion. The first and second down-shifting criteria for each of the transmission speed ratio ranges are set in the ROM 314 in the control unit 300. Therefore, the CPU 313 selects one of the first and second down-shifting criteria corresponding to the currently selected transmission speed ratio according to a predetermined criteria selecting schedule. According to the preferred embodiment, the CPU 313 initially selects the first down-shifting criterion in response to entry of the down-shift command and maintains the first down-shifting criterion for a predetermined period of time, and subsequently, after expiration of the predetermined time period, the second down-shifting criterion is selected. The process of selecting one of the first and second down-shifting criteria will be discussed in detail with reference to FIG. 5.

Figure 5:
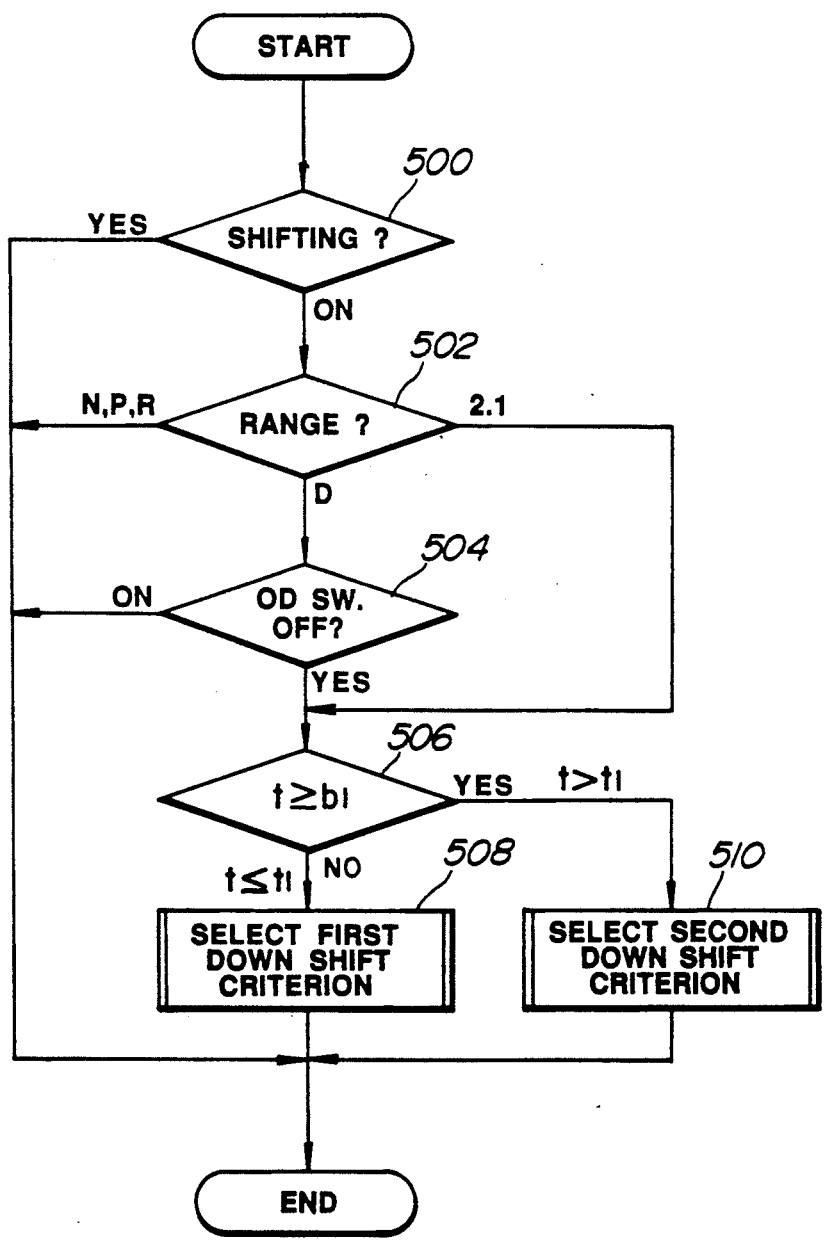
FIG. 5 is a flowchart of a routine for selecting down-shifting criteria for controlling down-shift timing, to be triggered in response to a down-shift command.

The routine illustrated in FIG. 5 is triggered at predetermined timings. At the initial step after starting execution, a check is performed whether the automatic power transmission is in a state of shifting transition, in which the transmission speed ratio is varied from one speed ratio to another speed ratio, at a step 500. When the transmission is in the shifting transition state as checked at the step 500, the process directly goes to END. On the other hand, if the transmission as checked at the step 500 is not in the shifting transition state, the current transmission selector range is checked at a step 502. When the selected operational range of the automatic power transmission, as checked at the step 502, is P (parking) range, R (reverse) range or N (neutral) range, the process again goes to END directly. On the other hand, if the selected operational range is D (drive) range for automatic shifting over various speed ratios. A check is performed whether an over-drive switch 310 is in OFF position, at a step 504. When the over-drive switch 310 as checked at the step 504 is held ON, the process directly goes to END.

On the other hand, if the selected operational range as checked at the step 502 is 1 (first hold) range or 2 (second hold) range, the process skips the step 504. The answer at the step 504 will be positive because of the OFF position of the over-drive switch 310 if the selected operational range is a 1 range or a 2 range. At a step 506 a timer, which is triggered to start measurement of elapsed time upon entry of a down-shift command such as a cancellation or turning OFF of the over-drive switch 310, or shifting of the selector to a lower speed ratio range, measures a timer value t. When the timer value t is smaller than or equal to a timer threshold $t_1$, the first down-shifting criterion is selected at a step 508. On the other hand, when the timer value t is greater than the timer threshold $t_1$, then, the second down-shifting criterion is selected at a step 510.

Figure 6:
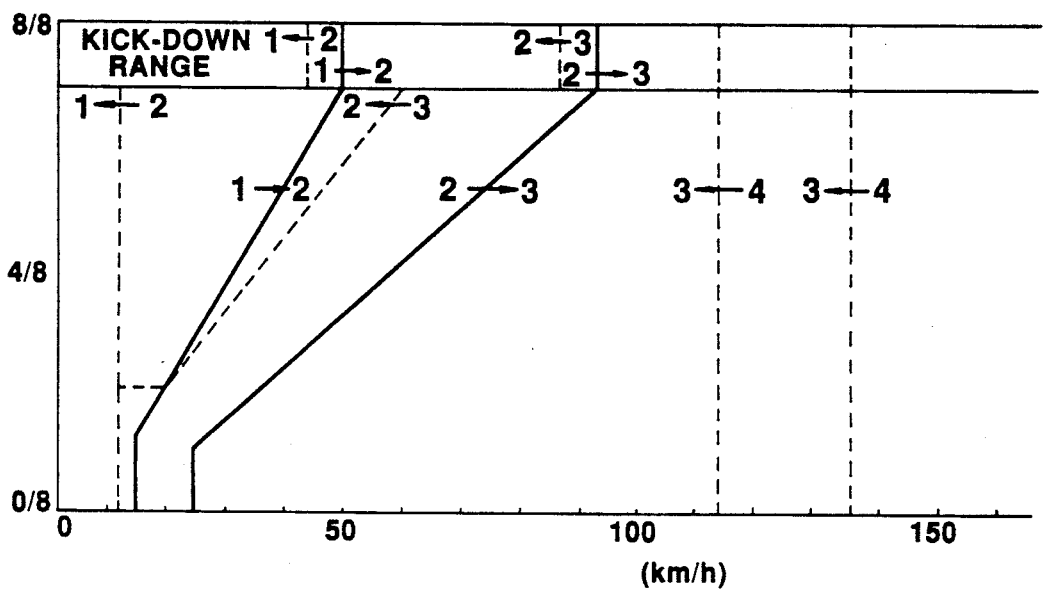
FIGS. 6 through 8 are charts showing down-shifting criteria relative to throttle valve angular position and vehicle speed at respective speed ratio ranges.
Figure 7:
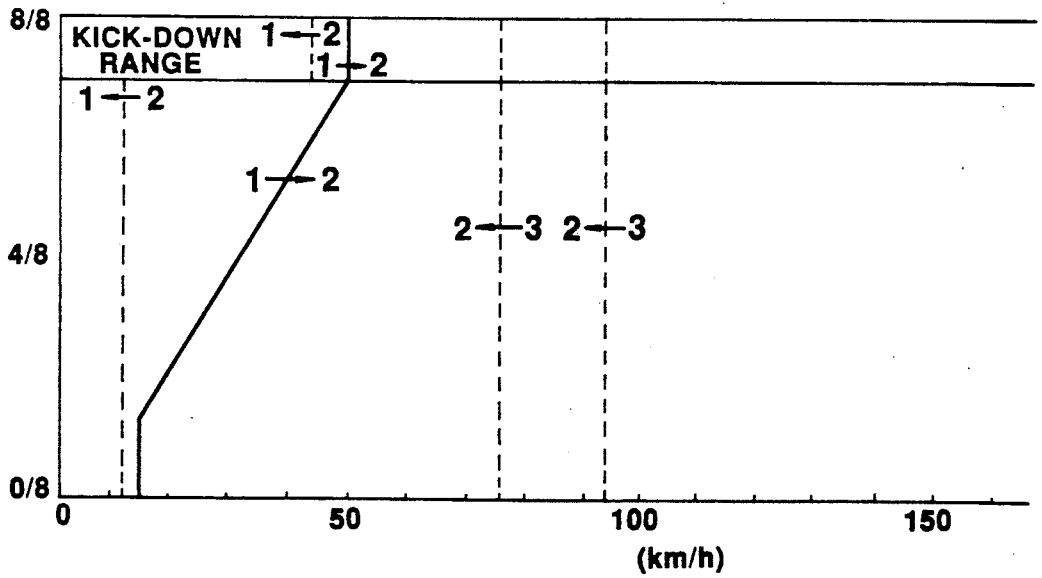
Figure 8:
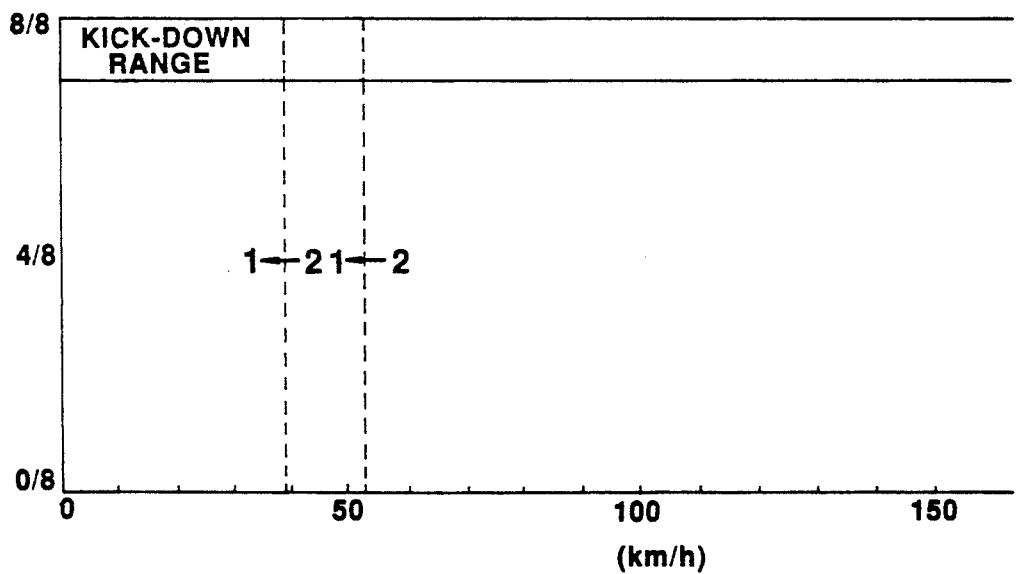

FIGS. 6 through 8 show down-shifting criteria practically set in the shown embodiment of the shift control system for the automatic power transmission according to the present invention. FIG. 6 shows 1-2 down-shifting criteria, 2-3 down-shifting criteria and 3-4 down-shifting criteria in the D range. On the other hand, FIG. 7 shows 1-2 down-shifting criteria and 2-3 down-shifting criteria in the 2 range. Furthermore, FIG. 8 shows 1-2 down-shifting criteria in the 1 range.

In FIG. 6, 4-3 down-shifting to vary the speed ratio from fourth (over-drive) speed ratio to the third speed ratio is performed in response to cancellation of the over-drive switch 310. Practically, the first 4-3 down-shifting criterion is set at 136 km/h irrespective of the throttle valve angular position so that the fourth speed ratio is maintained as long as the vehicle speed is maintained higher than 136 km/h and the speed ratio is varied into the third speed ratio when the vehicle speed drops across 136 km/h. The first 4-3 down-shifting criterion is set so that the engine revolution speed becomes an allowable maximum speed when 4-3 down shifting is initiated at the corresponding vehicle speed. The second 4-3 down-shifting criterion is set at 114 km/h. On the other hand, as can be seen from FIG. 6, at the D range, 3-2 down-shifting criterion is variable depending upon the throttle valve angular position so that 3-2 down shifting is performed at a higher vehicle speed the greater the throttle valve opening angle. Also, in D range, the first 2-1 down-shifting criterion varies according to variation of the vehicle speed and of the throttle valve angular position, and the second 2-1 down-shifting criterion is held constant irrespective of the vehicle speed and the throttle valve angular position.

In FIG. 7, the first 3-2 down-shifting criterion is practically set at a vehicle speed of 93 km/h, and the second 3-2 down-shifting criterion is set at a vehicle speed of 76 km/h. Also, as shown in FIG. 8, the first 2-1 down-shifting criterion is set at a vehicle speed of 53 km/h and the second 2-1 down-shifting criterion is set at a vehicle speed of 39 km/h. The first down-shifting criteria for 3-2 down-shifting and 2-1 down-shifting are also determined so that the engine revolution speed is increased to the allowable maximum speed.

Such strategy in the selection of the down-shifting criteria is advantageous for adjusting the timing of actual down-shifting operations because it can successfully avoid overrunning of the engine when the vehicle speed is far higher than the down-shifting criterion and can provide higher response characteristics to a down-shift command when the vehicle speed is not so high in relation to the down-shifting criterion (first down-shifting criterion). For example, assuming the vehicle is driven at the third speed ratio with the selector set in the D range, the first 3-2 down-shifting criterion (93 km/h) is initially selected in response to shifting of the selector into the 2 range. If the vehicle speed upon shifting of the selector into the 2 range is lower than or equal to the first 3-2 down-shifting criterion, the 3-2 down-shifting operation is instantly initiated with substantially no delay time. At this moment, since the first 3-2 down-shifting criterion (93 km/h) is set so that the engine revolution speed at the second speed ratio may not exceed the allowable maximum engine revolution speed, overrunning of the engine is never caused. On the other hand, if the vehicle speed is close to, but higher than, the first 3-2 down-shifting criterion so that the vehicle speed can be dropped within the predetermined period t1, a 3-2 down-shifting is performed when the vehicle speed drops across the first 3-2 down-shifting criterion. Furthermore, when the vehicle speed is far higher than the first 3-2 down-shifting criterion so that it requires a longer period than the predetermined time period t1 to decelerate to the threshold of the first 3-2 down-shifting criterion, the second 3-2 shifting criterion (76 km/h) is selected upon expiration of the predetermined period t1. Therefore, down-shifting is actually caused when the vehicle speed drops across the second 3-2 down-shifting criterion. This is advantageous in view of vehicle driving stability.

For instance, as in the prior proposals, it is possible to set the down-shifting criterion at the vehicle speed corresponding to the first down-shifting criterion of the present invention. In such case, the engine revolution speed is increased to the allowable maximum speed whenever the down-shift command is entered at a vehicle speed higher than the down-shifting criterion. Particularly, when the vehicle speed is far higher than the down-shifting criterion, the engine revolution speed is increased rapidly toward the allowable maximum speed at a timing unknown to the driver. Such rapid increase of the engine revolution speed with substantial magnitude of delay time may shock the driver and degrade the feel, or comfort of driving the vehicle. Furthermore, 3-2 down-shifting at a timing unknown to the driver may provide a substantial or excessive magnitude of engine braking effect also lowering vehicle driving stability.

In contrast to the above, according to the preferred process of shift control, since the second down-shifting criterion is used when the vehicle speed is higher than the first down-shifting criterion in the extent that it requires a longer period to decelerate the vehicle across the first down-shifting criterion than the predetermined period, actual down-shifting will cause an increase in engine revolutions. In such case, the accelerated engine revolution speed can be held lower than the allowable maximum engine speed. This clearly reduces shock to the driver and also reduces degradation of driving stability.

Though the foregoing discussion has been concentrated on shift timing for 3-2 down-shifting, substantially the same operation and advantages can be achieved when down-shifting from any range.

Figure 9:
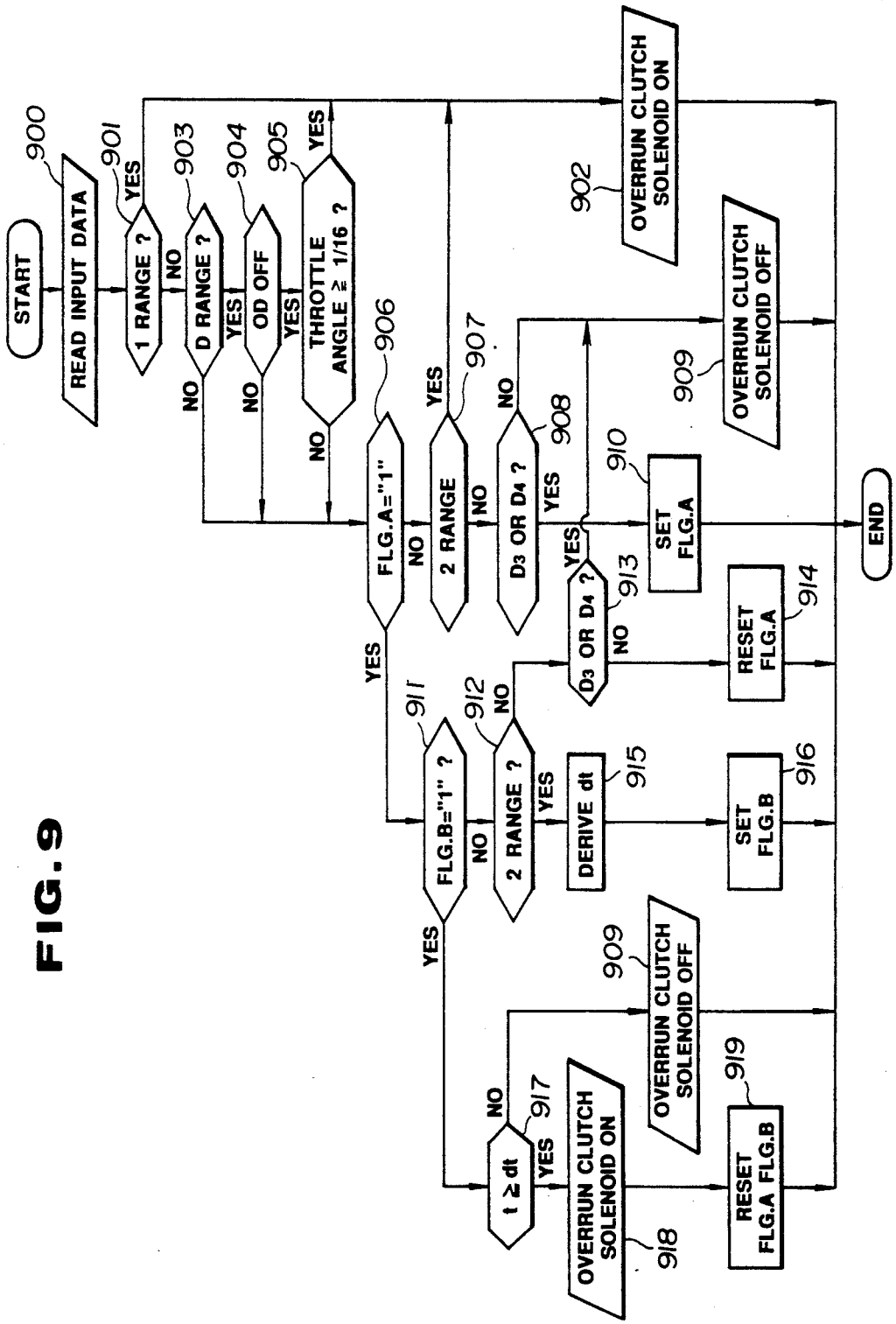
FIG. 9 is a flowchart of a routine for controlling a timing of engagement of an overrun clutch in response to a demand for engine braking effect.

On the other hand, overrun clutch control is performed in the routine separately established from that shown in FIG. 5. The routine for controlling activity of the overrun clutch 24 is illustrated in FIG. 9. The shown routine of FIG. 9 will be triggered at a different timing from that of FIG. 5 as governed by time-sharing a controlling main program which may be executed cyclically as a background job.

At a step 900, input data from the sensors, detectors and switches as set forth above, are read out. Then, the selected or command speed ratio is checked through the processes at steps 901 and 903. A check of the commanded speed ratio is performed by checking the input data representative of the selector position indicative signal value SEL from the selector position switch 304. If the commanded operational mode through the selector lever is a 1 range, then a HIGH level overrun clutch control signal is issued by the control unit 300 and delivered to the overrun clutch solenoid 82. Therefore, in such case, the overrun clutch 24 is engaged instantly in response to the command for downshifting down to the first transmisson speed ratio, at a step 902. After setting and outputting the HIGH level overrun clutch control signal for establishing engagement of the overrun clutch 24 at the step 902, the process goes to END, and is returned to the main program.

On the other hand, when the command transmission speed ratio as checked at the step 901 is other than the first transmission speed ratio, then a check is performed whether the command operational mode is in a D range, at a step 903. If the commanded operational mode as checked at the step 903 is in the D range, a further check is performed whether the over-drive (OD) cancel switch 310 is in over-drive cancel position or not, at a step 904. If the over-drive cancel switch 310 is in an over-drive cancel position (OFF), a further check is performed whether the throttle valve open ratio is smaller than or equal to 1/16 of the fully open position, at a step 905. If the answer at the step 905 is positive and thus judgement can be made that the throttle valve open angle is substantially small, then process goes to the step 902 for outputting the HIGH level overrun clutch control signal to the overrun clutch solenoid 82.

When the commanded operational mode is not in the D range as checked at the step 903, when the over-drive switch 310 is in an over-drive permitting position (ON) as checked at the step 904, or when the throttle valve open ratio is greater than 1/16 as checked at the step 905, process does to a step 906, in which a high speed ratio driving mode indicative flag FLG. A is checked. The high speed ratio driving mode indicative flag FLG. A is maintained in a set condition while the engine is driving the vehicle. The high speed ratio driving mode indicative flag is reset while the transmission speeds ratio is maintained at a relatively low transmission speed ratio, i.e. a first speed ratio and a second speed ratio If the high speed ratio driving mode indicative flag FLG. A is in a reset state (0) as checked at the step 906, a check is performed whether the commanded operational mode is in a 2 range, at a step 907. If so, the process goes to the step 902 for instantly engaging the overrun clutch. On the other hand, when the commanded operational mode as checked at the step 907, the current transmission speed ratio $D_1$ is checked at a step 908. If the instantaneously selected speed ratio is not $D_3$ or $D_4$ as checked at the step 908, LOW level overrun clutch control signal to maintain the overrun clutch 24 in a disengaged state is output at a step 909. On the other hand, if the instantaneous speed ratio as checked at the step 908 is $D_3$ or $D_4$, then the high speed ratio driving mode indicative flag FLG. A is set at a step 910.

When the high speed ratio driving mode indicative flag FLG. A is set as checked at the step 906, a delay period indicative flag FLG. B is checked at a step 911. The delay period indicative flag FLG. B is maintained in a set state during a delay period for providing a given lag time in shifting down the speed ratio into the engine braking speed ratio, i.e. a second speed ratio. If the delay period indicative flag FLG. B is not set as checked at the step 911, judgement can be made that the state of control is not in the down-shifting delay period. In such case, a check is performed at a step 912 whether the commanded operational mode is in a 2 range. If the commanded operational mode is not in a 2 range as checked at the step 912, a further check is performed whether the instantaneous speed ratio is in $D_3$ or $D_4$, at a step 913. When the instantaneous speed ratio as checked at the step 913 is $D_3$ or $D_4$, then process does to the step 909 to output a LOW level overrun clutch control signal to maintain the overrun clutch in a disengaged state. On the other hand, when the instantaneous speed ratio is not $D_3$ and $D_4$ in step 913, then the high speed ratio driving mode indicative flag FLG. A is reset at a step 914.

When the commanded operational mode is in a 2 range as checked at the step 912, a process for deriving the given delay period is performed at a step 915. The process of deriving the delay period $d_t$ is performed based on the vehicle speed and the throttle valve open ratio. As can be seen from FIGS. 10 and 11, according to the shown embodiment, the delay period is increased linearly according to increasing of the throttle valve open ratio and according to increasing of the vehicle speed. Therefore, in the shown embodiment, the delay period $d_t$ is variable depending upon not only the throttle valve open ratio, but also the vehicle speed. Though the shown embodiment employs both of the throttle valve open ratio and the vehicle speed for deriving the delay period $d_t$, it may be possible to use either of the throttle valve open ratio or the vehicle speed in order to derive the delay period. After deriving the delay period at the step 915, the delay period indicative flag FLG. B is set at a step 916. Setting of the delay period indicative flag FLG. B represents starting of the delay period for shifting down the transmission speed ratio after expiration of the set delay period. At the same time, a timer for measuring an elasped time is triggered.

Once the delay period indicative flag FLG. B is set at the step 916, the answer at the step 911 becomes positive. Therefore, a check is performed whether the elasped time t as measured by the timer becomes greater than or equal to the set delay period $d_t$, at a step 917. Until the measured elapsed time becomes greater than or equal to the set delay period $d_t$, the overrun clutch control signal maintained at LOW level to maintain the overrun clutch disengaged, is output at the step 909. On the other hand, when expiration of the delay period is detected at the step 917, then a HIGH level overrun clutch control signal is supplied to the overrun clutch solenoid 82 to establish engagement of the overrun clutch, at a step 918. Thereafter, both of the high speed ratio indicative flag FLG. A and the delay period indicative flag FLG. B are reset at a step 919.

Figure 13:
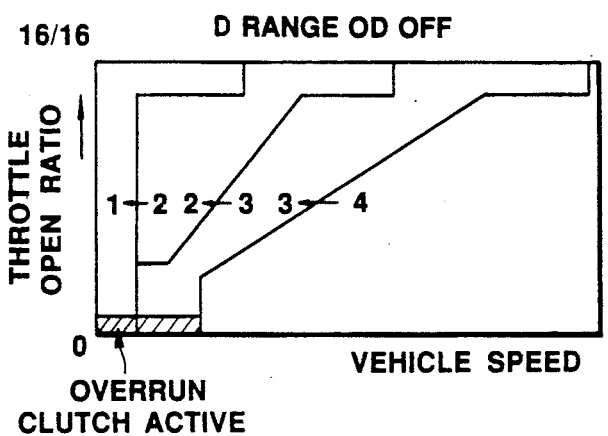
FIGS. 13 to 15 are charts showing the throttle valve angular range for establishing engagement of the overrun clutch.
Figure 14:
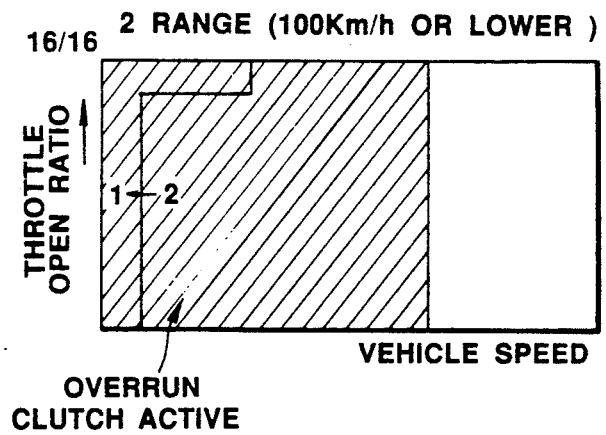
Figure 15:
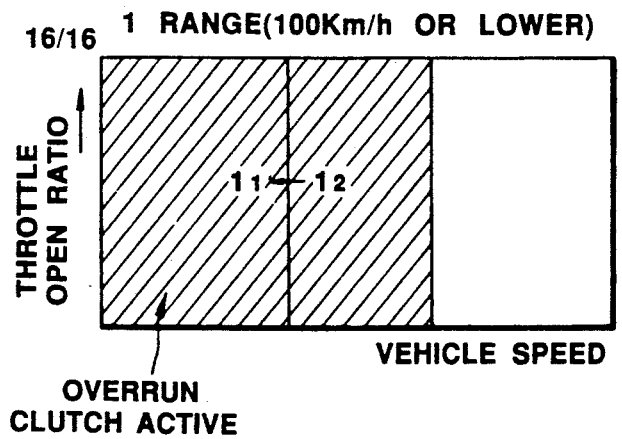

As will be appreciated, the delay period variation characteristics as illustrated in FIGS. 10 and 11 may be variable depending upon timing of operation of other frictional elements, such as the high clutch so as to avoid interlocking between the high clutch and the overrun clutch or down-shifting via a neutral state. As can be seen from FIGS. 12 through 15, while the selector level is placed at engine braking ranges, i.e. at a 1 range or at a 2 range, the overrun clutch is engageable at an overall range of throttle valve open degree (FIGS. 14 and 15; and while the selector lever is placed at D range and the transmission speed ratio is third speed ratio, an overrun clutch engagement is performed at a substantially small throttle valve open angle or after a given delay period (FIG. 13.

While the present invention has been disclosed in terms of the preferred embodiment in order to a facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

As can be appreciated from the detailed discussion given hereabove, the present invention fulfills all of the objects and advantages sought therefor.

What is claimed is:

1. A control system for an automatic power transmission for an automotive vehicle, comprising:
   a plurality of frictional elements selectively establishing a plurality of mutually distinct transmission speed ratios which include at least a first selectable speed ratio and a second selectable speed ratio, said frictional elements including an overrun clutch for delivery of negative driving torque from a final drive to an automotive internal combustion engine for deceleration of the latter;

a sensor means for monitoring a vehicle traveling condition for producing a second sensor signal indicative of a vehicle traveling condition;

means for manually entering a command for selection of a transmission speed ratio from among the plurality of speed ratios; and a controller responsive to said transmission speed ratio selection command, for detecting a demand for engine braking, said controller discriminating a mutually distinct first mode of engine braking demand, in which said transmission speed ratio selection command is maintained at said first selectable speed ratio, and a second mode of engine braking demand, in which the transmission speed ratio selection command is the command for said first selectable speed ratio, said controller being responsive to said first mode of engine braking demand for instantly commanding engagement of said overrun clutch, and being responsive to said second mode of engine braking demand for deriving a delay time based on said second sensor signal, and commanding engagement of said overrun clutch after expiration of said delay time.

2. A control system for an automatic power transmission as set forth in claim 1, wherein said sensor means further comprises an engine speed demand sensor for monitoring a position of an engine speed control element which is coupled with a manually operable engine speed control means for detecting demand for an engine revolution speed and producing a first sensor signal indicative of the monitored engine speed demand, and said controller is responsive to said engine speed demand smaller than a predetermined criterion representative of about no demand for engine acceleration, for instantly commanding engagement of said overrun clutch.

3. A control system for an automatic power transmission as set forth in claim 2, wherein said engine speed demand sensor comprises a throttle angle sensor for monitoring a throttle valve angular position.

4. A control system for an automatic power transmission for an automotive vehicle, comprising:

a plurality of frictional elements selectively establishing a plurality of mutually distinct transmission speed ratios which include at least a first selectable transmission speed ratio and a second selectable transmission speed ratio, said frictional elements including an one-way clutch for exclusively permitting delivery of engine driving torque from an automotive internal combustion engine to a final drive, and an overrun clutch provided in a parallel relationship with said one-way clutch for exclusively delivering engine braking torque from a final drive to an automotive internal combustion engine for deceleration of the latter;

a sensor means for monitoring a vehicle traveling condition for producing a second sensor signal indicative of a vehicle traveling condition;

means for manually entering a command for selection of a transmission speed ratio from among the plurality of speed ratios;

a controller responsive to said transmission speed ratio selection command, for detecting a demand for engine braking, said controller discriminating a mutually distinct first mode of engine braking demand, in which said transmission speed ratio selection command is maintained at said first selectable speed ratio, and a second mode of engine braking demand, in which said transmission speed selection command is other than the command for said first, and selectable speed ratio to said second selectable speed ratio, said controller being responsive to said first mode of engine braking demand for instantly commanding engagement of said overrun clutch, and being responsive to said second mode of engine braking demand for deriving a delay time based on said second sensor signal, and commanding engagement of said overrun clutch after expiration of said delay time.

5. A control system for an automatic power transmission for an automotive vehicle, comprising:

a plurality of frictional elements selectively establishing a plurality of mutually distinct transmission speed ratios which include at least a first selectable speed ratio and a second, selectable speed ratio, said frictional elements including an overrun clutch for delivery of a negative driving torque from a final drive to an automotive internal combustion engine for deceleration of the latter;

a sensor means for monitoring a vehicle traveling condition for producing a second sensor signal indicative of a vehicle traveling condition, said sensor means including a vehicle speed sensor for monitoring a traveling speed to produce a vehicle speed indicative signal;

means for manually entering a command for selection of a transmission speed ratio among a plurality of speed ratios;

a controller responsive to said transmission speed ratio selection command, for detecting a demand for engine braking, said controller discriminating a mutually distinct first mode of engine braking demand, in which said transmission speed ratio selection command is maintained at said first selectable speed ratio, and a second mode of engine braking demand, in which the transmission speed ratio selection command is other than the command for said first selectable speed ratio, and to said second lower selectable speed ratio, said controller being responsive to said first mode of engine braking demand for instantly commanding engagement of said overrun clutch, and being responsive to said second mode of engine braking demand for deriving a delay time based on said vehicle speed indicative signal so that said delay time is increased according to an increase of said vehicle speed indicative signal value, and commanding engagement of said overrun clutch after expiration of said delay time.

6. A control system for an automatic power transmission for an automotive vehicle, comprising:

a plurality of frictional elements selectively establishing a plurality of mutually distinct transmission speed ratios which include at least a first selectable speed ratio and a second selectable transmission speed ratio, said frictional elements including a one-way clutch for exclusively permitting delivery of engine driving torque from an automotive internal combustion engine to a final drive, and an overrun clutch provided in a parallel relationship with said one-way clutch for exclusively delivery of engine braking torque from a final drive to an automotive internal combustion engine for deceleration of the latter;

a sensor means for monitoring a vehicle traveling condition for producing a second sensor signal indicative of a vehicle traveling condition, said sensor means including a vehicle speed sensor for monitoring a traveling speed to produce a vehicle speed indicative signal;

means for manually entering a command for selection of a transmission speed ratio among a plurality of speed ratios;

a controller responsive to said transmission speed ratio selection command, for detecting a demand for engine braking, said controller discriminating a mutually distinct first mode of engine braking demand, in which said transmission speed ratio selection command is maintained at said first selectable speed ratio, and second mode of engine braking demand, in which transmission speed ration selection command is the command for said first higher selectable speed ratio, and to said second lower selectable speed ratio, said controller being responsive to said first mode of engine braking demand for instantly commanding engagement of said overrun clutch, and being responsive to said second mode of engine braking demand for deriving a delay time based on said vehicle speed indicative signal so that said delay time is increased according to an increase of said vehicle speed indicative signal value, and commanding engagement of said overrun clutch after expiration of said delay time.

7. A control system for an automatic power transmission as set forth in claim 6, wherein said sensor means further comprises an engine speed demand sensor for monitoring a position of an engine speed control element which is coupled with a manually operable engine speed control means for detecting demand for an engine revolution speed and producing a first sensor signal indicative of the monitored engine speed demand, and said controller is responsive to said engine speed demand smaller than a predetermined criterion representative of about no demand for engine acceleration, for instantly commanding engagement of said overrun clutch.

8. A control system for an automatic power transmission as set forth in claim 7, wherein said engine speed demand sensor comprises a throttle angle sensor for monitoring a throttle valve angular position.

* * * * *